May 2, 1967
C. H. GRANT
3,317,162
AIRCRAFT WING WITH INTERNAL AIR PASSAGES FOR INCREASED LIFT
Filed July 13, 1965
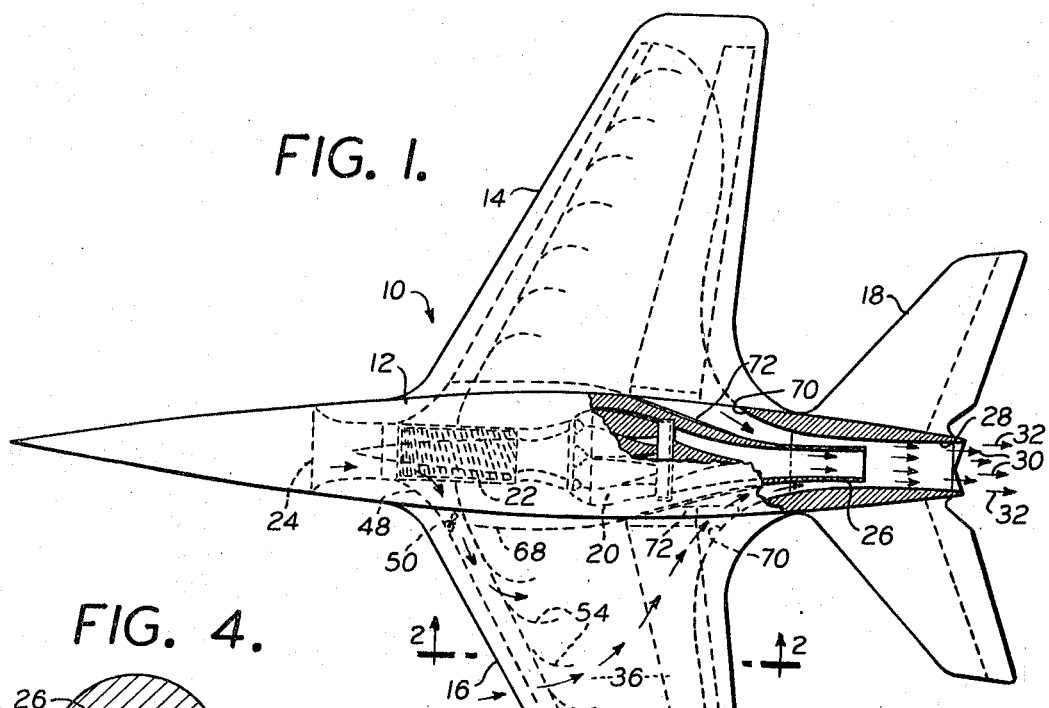
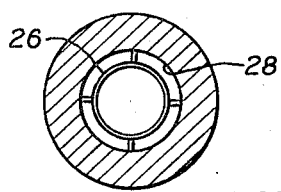
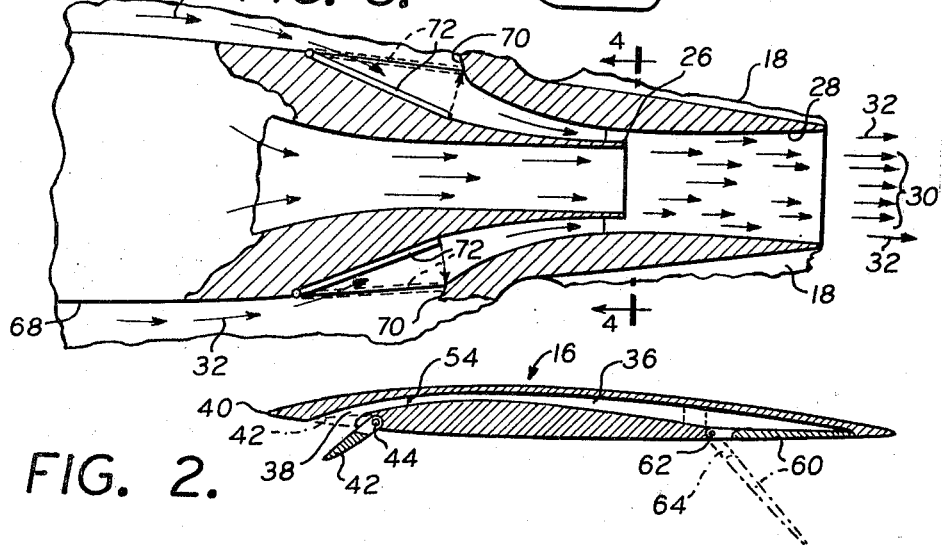
INVENTOR
Charles H. Grant
BY
ATTORNEYS.

United States Patent Office 3,317,162
Patented May 2, 1967

3,317,162
AIRCRAFT WING WITH INTERNAL AIR PASSAGES FOR INCREASED LIFT
Charles H. Grant, Box 247, Cottage St., Manchester Center, Vt. 05255
Filed July 13, 1965, Ser. No. 471,688
14 Claims. (Cl. 244—42)

This invention relates to aircraft and more especially with a wing construction for increasing the lift of the aircraft.

It is an object of the invention to provide an improved aircraft construction in which air drawn through hollow portions of the wings is used to provide additional lift for the wings. In the preferred construction, the air travels through a passage which increases in cross section and height as the air travels rearwardly, and the air is deflected downwardly to produce an increase in pressure against the top of the passage while rarification of the air occurs in the lower part of the passage because of the expanding cross section. This produces a pressure differential that adds to the lift of the wing.

Another object of the invention is to provide an aircraft, of the character indicated, with means for producing suction at the rearward part of wing passages to increase the rate of air flow through the wing; and to provide means for exposing the forward portion of the wing passage to pressure from the winds of flight to facilitate entry of air into the wings.

The invention is particularly applicable to jet aircraft where the exhaust from jet flow can be used effectively to aspirate air through the wings; and it can be used also with jet aircraft having blowers of sufficient capacity to supply at least a portion of their air to the passages in the wings.

Other features of the invention relate to the closing of the passages through the wings for high-speed flight when added lift is unnecessary and for more efficient operation at high speed.

Other objects, features and advantages of the invention will appear or be pointed out as the description proceeds.

In the drawing, forming a part hereof, in which like reference characters indicate corresponding parts in all the views:

FIGURE 1 is a diagrammatic view, partly broken away and in section, showing an aircraft having air passages through the wings and having provision for producing a flow of air through the passages;

FIGURE 2 is an enlarged sectional view taken on the line 2—2 of FIGURE 1;

FIGURE 3 is an enlarged detail view of a portion of the construction near the tail of the aircraft shown in FIGURE 1; and FIGURE 4 is a sectional view on the line 4—4 of FIGURE 3.

FIGURE 1 shows an aircraft 10 having a fuselage 12 and wings 14 and 16. The aircraft has a tail 18 of conventional construction.

The aircraft 10 is propelled by a jet engine 20 supplied with air from a blower 22 having an inlet 24 near the forward part of the fuselage.

The jet engine has a tail pipe 26 directed rearwardly through an outlet opening 28 which is of venturi cross section. The tail pipe 26 preferably terminates near the throat of the venturi opening 28 and with a clearance between the tail pipe 26 and the side of the opening 28 around the circumference of the tail pipe. The blast from the tail pipe 26, indicated by the arrows 30, aspirates air through the opening 28 to provide an insulating layer of cool air 32 around the tail pipe 26. This air mixes with the boundary layers of the jet stream to some extent but prevents overheating of the sides of the opening 28. In the preferred construction, the sides of the opening 28 are made of heat-insulating material to prevent transfer of heat to the surrounding portions of the frame structure and especially the tail.

The wings 14 and 16 are hollow over most of their extent. The construction of the wing 16 will be described, and it will be understood that the wing 14 is of similar construction with the necessary reversals for the other side of the aircraft.

The hollow interior of the wing 16 provides a passage 36 through which air travels. This passage 36 has a spanwise-extending inlet 38 at its forward end. In the illustrated construction, this inlet 38 opens through the bottom surface of the wing 16 near the leading edge 40 of the wing. The inlet 38 can be located at the leading edge or in the top surface of the wing, but the preferred construction locates the inlet 38 as illustrated and provides a gate 42 which can be used to deflect air upwardly into the inlet 38. The inlet 38 may also be closed to external air flow but connected to a power driven blower through passage-ways inside the aircraft structure.

The gate 42 is movable between open and closed positions. In its open position, shown in full lines in FIGURE 2, the gate 42 extends downwardly and forwardly with respect to the air foil section of the wing 16. In this position, the gate 42 is in the flow path of the relative wind of flight and produces a pressure under the opening 38 for deflecting some of the relative wind upward into the wing. A clearance 44 between the gate 42 and the wing 16, across most of the spanwise extent of the gate 42, provides for flow of a substantial volume of air across the bottom surface of the wing 16 in addition to the air which passes under the gate 42 and then upward toward the wing 16.

When the gate 42 is in closed position, as shown in dotted lines in FIGURE 2, it covers the inlet 38 and prevents movement of air into or out of the wing through the inlet opening 38. Air can be supplied to the interior of the wing 16, when the gate 42 is closed, by the blower 22 (FIGURE 1), of the jet motor. An outlet duct 48 of the blower 22 leads into the passage 36 in the wing 16. Flow through the duct 48 can be controlled by a valve 50.

Within the passage 36, there are preferably deflectors 54 at locations spaced spanwise across the wing 16 to distribute the air flow more evenly in the passage 36. As the passage 36 extends rearwardly, it increases in cross section in a vertical direction, as is evident from FIGURE 2; and the top of the passage curves so as to deflect the air stream through the passage downward. In thus deflecting the air stream downward, an upward reaction force against the top of the passage 36, provides lift for the wing 16. Because of the progressively increasing height of the passage 36, there is a rarification of the air stream along the bottom of the passage and this decreases the air pressure exerted downward in the passage and provides a further differential of upward pressure.

The wing 16 has a flap 60 which closes the air passage 36 when the flap is in its raised position, shown in full lines in FIGURE 2. When the flap 60 is deflected, as shown in dotted lines in FIGURE 2, it opens a large outlet passage through the bottom of the rearward portion of the passage 36 and it produces a reduced pressure on its top surface and causes a suction for increasing the rate of flow of air through the passage 36.

The flap 60 is hinged to the wing 16 along an axis 62 and it may have a clearance 64, when in lowered position, for the flow of air across the leading edge of the flap and then downward over the top surface of the flap. In its deflected position, the flap 60 produces increased lift for the aircraft in accordance with conventional practice; but it also produces a further lifting effect by the suction of greater quantities of air through the passage 36 in the wing 16.

The passage 36 through the wing is closed by a wall 68 along the portion of the fuselage rearward of the duct 48 and as far back as an outlet 70 through which the passage 36 of the wing communicates with the clearance around the tail pipe 26 in the exhaust opening 28. There is a gate 72 which closes the outlet 70 when the gate 72 is in the closed position shown in dotted lines in the drawing. When the gate 72 is moved into the open position shown in full lines, air is aspirated from the wing passage 36 through the outlet 70 by the blast from the tail pipe 26.

FIGURES 3 and 4 show the construction of the tail pipe 26 and exhaust opening 28 on a larger scale and for the purpose of indicating by arrows the flow of the blast from the tail pipe 26 and the flow of aspirated air 32.

The preferred embodiment of the invention has been illustrated and described. It will be understood that the invention can be made with different combinations, including constructions having a blower for the supply of air to the wing without the inlet 38, or with the air inlet 38 and no provision for supplying air to the wings by a mechanical blower. It will be further understood that the wing can be constructed with a conventional flap which does not affect the air flow through the wing, and where suction for the air flow, if desired, can be obtained exclusively from aspirator action from the exhaust. Various other changes can be made in the combination without departing from the invention as defined in the claims.

What is claimed is:

1. An aircraft including wings of airfoil chordwise section and having flaps pivotally connected thereto, the wings having fixed passages therein extending in directions having a substantial chordwise component, each of the passages being formed by fixed structure of the wings, said fixed structure enclosing the passage and each of said passages having a vertical projection that decreases in height as it extends rearwardly to a throat at which the spanwise cross section of the passage is less than that at either end of the passage, the passage increasing progressively in cross section rearward of the throat and having an exit end with a spanwise cross section greater than that of the throat, said passage forming a fixed venturi, the center axis of which is curved between its entrance and exit ends in a direction to deflect a gaseous fluid downward beyond the throat, the bottom of the passage beyond the throat extending downwardly at a more rapid rate than the top of the passage to increase the cross section of the passage as said passage extends rearwardly and to rarefy the gaseous fluid flowing along the bottom of the passage.

2. The aircraft described in claim 1 characterized by means at the rearward end of the passage through the wing for producing a suction to increase the rate of air flow through the passage.

3. The aircraft described in claim 1 characterized by the opening at the front end of the passage being in position to encounter the air pressure of the relative wind of flight.

4. The aircraft described in claim 3 characterized by the wing having a scoop at the forward part thereof for increasing the flow of air into the passage.

5. The aircraft described in claim 2 characterized by the aircraft having a jet engine with a tail pipe, and the rearward opening from the air passage through the wing opening into the upstream end of a second venturi passage that surrounds the tailpipe and that is spaced therefrom with heat insulation on the sides of the second venturi passage at the region of the jet exhaust, the air from the wing passage being aspirated into the second venturi by the jet stream from the tailpipe and forming a cooling layer of air around the jet stream.

6. The aircraft described in claim 1 characterized by a fuselage, the hollow wings extending spanwise on opposite sides of the fuselage, each of the wings having a leading edge and a trailing edge, the venturi passage being an air chamber within each wing and through which air passes.

7. The aircraft described in claim 6 characterized by the chamber enclosed in each hollow wing between the air inlet and air outlet thereof having a substantial spanwise extent and the inlet including a spanwise extending opening through the wing near the leading edge thereof, and adjustable means for controlling the flow of air into said inlet from the winds of flight.

8. The aircraft described in claim 7 characterized by the inlet being an opening in the bottom of the wing for most of the extent of the wing beyond the fuselage, and the adjustable means being a scoop movable between raised and lowered positions, the scoop in its raised position extending in a chordwise direction across the inlet and forming a bottom surface of the wing that closes said inlet, the scoop in its lowered position extending downwardly and forwardly in a direction to deflect air upward into the inlet, and the scoop including connections to the wing at a substantial distance ahead of the air outlet and that swing most of the spanwise extent of the scoop down below the bottom surface of the wing so that there is a slot for passage of part of the air in front of the scoop to pass between the scoop and the bottom of the wing.

9. The aircraft described in claim characterized by the inlet including also a duct leading from the fuselage into the chamber of each wing, and a blower in the aircraft for supplying air to the ducts.

10. The aircraft described in claim 6 characterized by each wing having the outlet of the chamber including a spanwise opening through the wing near the flap, and a pivot connection between the flap and the wing at a substantial distance rearward of the air inlet.

11. The aircraft described in claim 10 characterized by the flap being movable between raised and lowered positions, and the flap being of a chordwise extent to completely close the spanwise opening through the wing and to form a continuation of the surface of the wing when in raised position.

12. The aircraft described in claim 11 characterized by the aircraft having a tail with an exhaust opening therein, and the wing chamber outlets also having passages leading to said exhaust opening.

13. An aircraft including a fuselage, wings extending spanwise on opposite sides of the fuselage, each of the wings having a leading edge and a trailing edge, an air chamber within each wing and through which air passes, an air inlet near a forward part of the chamber, an air outlet near the rearward part of the chamber, and surfaces in the chambers in position to deflect the air downward at one location along the course of flow of the air in the chamber from the inlet to the outlet to develop lift, the chamber in each wing having a substantial spanwise extent and the inlet including a spanwise extending opening through the wing near the leading edge thereof, adjustable means for controlling the flow of air into said inlet from the winds of flight, the inlet being an opening in the bottom of the wing for most of the extent of the wing beyond the fuselage, and the adjustable means being a scoop movable between raised and lowered positions, the scoop in its raised position extending in a chordwise direction across the inlet and forming a bottom surface of the wing that closes said inlet, the scoop in its lowered position extending downwardly and forwardly in a direction to deflect air upward into the inlet, and the scoop including connections to the wing that swing most of the spanwise extent of the scoop down below the bottom surface of the wing so that there is a slot for passage of part of the air in front of the scoop to pass between the scoop and the bottom of the wing, the inlet including also a duct leading from the fuselage into the chambers in each of the wings, a blower in the aircraft for supplying air to the ducts, each wing having a flap at the trailing edge thereof, the outlet of the chamber of each wing including a spanwise opening through the wing above the flap, said flap being movable between raised and lowered positions and being of a chordwise extent to completely close the spanwise opening through the wing above the flap and to form a continuation of the surface of the wing when the flap is in raised position, the aircraft having a tail with an exhaust opening therein and the wing chamber outlets also having passages leading to said exhaust opening, baffle means for selectively closing the inlets from the blower and the outlets to the exhaust selectively when the scoop and flap, respectively, are in their lowered positions.

14. The aircraft described in claim 13 characterized by the aircraft having a jet engine, the blower being a compressor for the jet engine, and the jet engine having a tailpipe discharging rearwardly into a throat of a venturi section of the exhaust and spaced from the sides of the venturi section rearward of the outlets from the wing chambers into the exhaust whereby the exhaust from the jet engine aspirates air from the wing chamber into the exhaust passage.

References Cited by the Examiner

UNITED STATES PATENTS

| | | | |
|---|---|---|---|
| 1,723,778 | 8/1929 | Hall | 244—42 |
| 2,401,941 | 6/1946 | Lee | 244—42 |
| 2,477,637 | 8/1949 | Mercier | 244—42 |
| 2,751,168 | 6/1956 | Stalker | 244—42 X |
| 2,891,740 | 6/1959 | Campbell | 244—42 X |
| 3,055,614 | 9/1962 | Thompson | 244—42 |
| 3,161,377 | 12/1964 | Balluff | 244—42 X |

MILTON BUCHLER, *Primary Examiner.*

B. BELKIN, *Assistant Examiner.*

UNITED STATES PATENT OFFICE
CERTIFICATE OF CORRECTION

Patent No. 3,317,162                                   May 2, 1967

Charles H. Grant

It is hereby certified that error appears in the above numbered patent requiring correction and that the said Letters Patent should read as corrected below.

Column 4, line 28, for "in claim" read -- in claim 8 --.

Signed and sealed this 14th day of November 1967.

(SEAL)
Attest:

Edward M. Fletcher, Jr.                                EDWARD J. BRENNER
Attesting Officer                                            Commissioner of Patents